United States Patent [19]

Campbell et al.

[11] Patent Number: 4,824,723

[45] Date of Patent: Apr. 25, 1989

[54] FLAME RESISTANT ELECTRICAL INSULATING MATERIAL

[75] Inventors: Richard W. Campbell; Kirk L. Kimbel, both of Evansville, Ind.

[73] Assignee: General Electric Company, Selkirk, N.Y.

[21] Appl. No.: 833,707

[22] Filed: Jun. 2, 1986

[51] Int. Cl.[4] ....................... B32B 27/00; B32B 27/06; B32B 27/36

[52] U.S. Cl. .................................... 428/332; 428/334; 428/336; 428/337; 428/412; 428/423.1; 428/423.7; 428/475.2; 428/480; 428/483; 428/500; 428/522; 428/921

[58] Field of Search ............... 428/412, 480, 336, 500, 428/522, 337, 332, 921, 483, 423.1, 423.7, 475.2, 334; 174/120 SR

[56] References Cited

U.S. PATENT DOCUMENTS

| | | | |
|---|---|---|---|
| 2,341,360 | 2/1944 | Bulgin | 428/921 |
| 2,393,967 | 2/1945 | Brubaker | 428/371 |
| 2,901,466 | 8/1959 | Kibler et al. | 528/220 |
| 3,023,192 | 2/1962 | Shievers, Jr. | 528/190 |
| 3,169,121 | 2/1965 | Goldberg | 528/194 |
| 3,189,662 | 6/1965 | Vaughn | 528/10 |
| 3,651,014 | 3/1972 | Witsiepe | 528/301 |
| 3,763,109 | 10/1973 | Witsiepe | 528/308 |
| 3,766,146 | 10/1973 | Witsiepe | 528/308 |
| 3,784,520 | 1/1974 | Hoeschele | 528/308 |
| 3,801,547 | 4/1974 | Hoeschele | 528/308 |
| 3,940,547 | 2/1976 | Needham et al. | 428/483 |
| 3,953,394 | 4/1976 | Fox et al. | 525/444 |
| 4,080,356 | 3/1978 | Gergen et al. | 525/400 |
| 4,156,774 | 5/1979 | Buxbaum et al. | 528/194 |
| 4,188,314 | 2/1980 | Fox et al. | 525/433 |
| 4,264,761 | 4/1981 | McGirk | 528/301 |
| 4,327,137 | 4/1982 | Sawa et al. | 428/412 |
| 4,329,444 | 5/1982 | Borman | 528/208.8 |
| 4,351,920 | 9/1982 | Ariga et al. | 525/285 |
| 4,355,155 | 10/1982 | Nelsen | 528/301 |
| 4,368,231 | 1/1983 | Egert et al. | 428/412 |
| 4,487,896 | 12/1984 | Mark et al. | 528/176 |
| 4,513,037 | 4/1985 | Collins | 428/412 |
| 4,540,623 | 9/1985 | Im et al. | 428/412 |

*Primary Examiner*—Lorraine T. Kendell
*Attorney, Agent, or Firm*—Hedman, Gibson, Costigan & Hoare

[57] ABSTRACT

A flame resistant electrically insulating multilayer material is described herein, in which a flame resistant core which may be comprised of coextrudable, thermoformable thermoplastic materials has at least one electrically insulating outer layer attached thereto. Preferred polymeric materials forming the core include blends of polycarbonates with halogen-containing polycarbonates. Each outer layer typically may be formed from polycarbonates and linear polyesters. The multilayer material may be shaped to surround and shield any sensitive device requiring protection from high voltage arcing or fire.

30 Claims, No Drawings

FLAME RESISTANT ELECTRICAL INSULATING MATERIAL

This invention relates in general to multilayer materials and more particularly to new and improved flame resistant electrical insulating materials, and to a method for shielding components in an electronic device.

BACKGROUND OF THE INVENTION

Materials which are used to shield and enclose various sensitive components in electronic devices generally must possess a high degree of electrical insulating capacity, while also possessing a high level of flame retardancy. For instance, such materials ideally have an arc track resistance greater than 90 seconds, and a surface resistivity greater than $10^9$ohms per square mil, while also having a flame resistance rating (UL 94) of V-0 when such a material has a thickness of about 5 mils to about 250 mils. Materials which have superior electrical insulating properties but inferior flame resistant properties, ad vice versa, are not acceptable for some end uses. An additional problem compicating the search for a material having both of the above-described properties arises when a particular additive enhances one property while detracting from the other. For example, halogen compounds added to a thermoplastic composition may improve the flame resistance of the material but may also decrease the arc track resistance of the material.

Prior art materials used to shield such components include fibrous substances such as asbestos. However the use of these materials creates other problems because such fibers are both carcinogenic and toxid by inhalation. Other prior art materials, such as those formed from aramid fibers, may provide a degree of flame resistance and elecrical insulation, but are very expensive, and often lack dimensional stability because of moisture absorption. Furthermore, such materials generally cannot be thermoformed into various shapes.

OBJECTS OF THE INVENTION

Accordingly, it is the primary object of the present invention to provide composites, i.e., multilayer materials, which overcome the foregoing disadvantages.

It is another object of the present invention to provide a multilayer material having the dual characteristics of high flame resistance and excellent electrical insulating ability, while also exhibiting excellent physical properties.

It is still another object of the present invention to provide a multilayer material which is amenable to coextrusion processes.

It is a further object of the present invention to provide a composite material which may be thermoformed into various shapes which conform to the shapes of components shielded by such material.

It is yet another object of the present invention to provide a method for shielding sensitive components in an electrical device with a flame resistant electrical insulating material.

SUMMARY OF THE INVENTION

The foregoing objects are generally achieved by a flame resistant electrically insulating multilayer material comprising a flame resistant core and an electrically insulating first thermoplastic outer layer attached to a first surface of the core. The material may further comprise an electrically insulating second thermoplastic outer layer attached to a second surface of the core opposite the first surface. The material forming the first and second outer layers is typically either a polyester, a polycarbonate, or a blend thereof, while the core is typically a thermoplastic polymer blended with a halogen-containing organic compound. The present invention further encompasses a method of shielding components in electronic devices from electrical discharges with a material which is also flame resistant, comprising:

(a) forming a shield by coextruding a flame resistant core material with an electrically insulating first thermoplastic outer layer attached to a first surface of the core and an electrically insulating second thermoplastic outer layer attached to a second surface;

(b) shaping the shield by thermoforming means into a shape which substantially coincides with the shape of the component; and (c) attaching the shield to the component.

The multilayer material of the present invention possesses good physical and mechanical properties while also displaying a high degree of flame resistance and electrical insulation capability. Furthermore, the material may be blended and extruded to form a wide variety of shaped articles for use in various applications, such as automotive fixtures, i.e., dashboard electrical connectors and interior fixtures and moldings; and electrical applications, such as tube bases, control shafts, television deflection-yoke components, meter housings, and connectors.

DETAILED DESCRIPTION OF THE INVENTION

The core of the multilayer material of the present invention may generally be formed from any of a wide variety of synthetic polymers, such as polyolefins, poly(aryl ethers), polyetherimides, polyamides, poly(aryl sulfones), thermoplastic polyurethanes, alkenyl aromatic polymers, acrylic-based polymers, polycarbonates, nitrile barrier resins, thermoplastic polyesters, as well as copolymer blends of the above-mentioned polymers. The core may also be formed from various thermosetting polymers, e.g., epoxies, unsaturated polyesters, and phenolic-based polymers. All of these polymers are well-known to those skilled in the art, and many of them are described in U.S. Pat. No. 4,080,356, incorporated herein by reference. Many of the above-mentioned polymers, such as the thermoplastic polyesters, ideally contain a flame retardant in an amount sufficient to achieve a flame retardant rating (UL 94) of V-0 when the particular material has a thickness of about 5 mils to about 250 mils. However, levels of a flame retardant which result in V-1 or V-2 ratings are also suitable for many end uses for the present invention. The particular polymer used for the core layer will of course depend in part upon the end use contemplated for the finished article, as well as depending in part upon the method in which the material will be processed and shaped. For example, when the multilayer material of the present invention is formed by coextrusion, the polymer forming the core generally must be a thermoplastic material. Furthermore, if the material of the present invention is to be further shaped by a thermoforming process after coextrusion, it is preferred that the core be formed of a material which is thermoformable, e.g., a material having an amorphous form, as described below.

In preferred embodiments of the present invention, the multilayer material is formed by coextrusion, and the core is either a thermoplastic polyester or polycarbonate having a flame retardant contained therein. In instances where the coextruded multilayer material is subsequently thermoformed, polycarbonates are especially preferred for the core of the present invention because of their excellent thermoformability. Polycarbonates suitable for the present invention are typically formed by the reaction of aromatic dihydroxy compounds with phosgene or with carbonate precursors such as diaryl carbonates. The polycarbonates preferably have a weight average molecular weight of from about 10,000 to about 70,000, and an intrinsic viscosity between about 0.3 dl/g and 1.0 dl/g as measured at 25° C. in methylene chloride. Methods for the preparation of polycaronates are well-known and are described, for example, in U.S. Pat. No. 4,351,920. An example of a typical polycarbonate suitable for the present invention is Lexan® resin, a product of Generaly Electric Company. Various flame retardants may be added to the polycarbonate during or prior to polymerization; some of these are described in more detail below.

Thermoplastic polyesters suitable for the core of the multilayer material of the present invention when the material does not have to be subsequently thermoformed include thermoplastic linear polyester resins such as poly(ethylene terephthalate) (PET) and poly(1,4-butylene terephthalate) (PBT). A suitable PBT resin for the present invention is commercially available from General Electric Company as VALOX® 315 resin. PBT is typically formed by the polycondensation of 1,4-butanediol and dimethyl terephthalate or terephthalic acid. A detailed description of the preparation of PBT is given in U.S. Pat. No. 4,329,444, issued to the assignee of the present invention and incorporated by reference herein. At least one of the flame retardants described below may be added to the linear polyesters in flame retarding amounts.

If the multilayer material is to be subsequently thermoformed, it is essential that the core contain an amorphous material, such as the polycarbonates or halogenated polycarbonates described below, and also styrene, polyimides, poly(phenyleneethers), polyacrylates, etc., as well as polymers which may be amorphous when prepared under certain conditions, e.g., poly(ethylene terephthalate).

Many well-known flame retardants are suitable for use in the core of the present invention. Nonlimiting examples of organic flame retardants include chlorinated and brominated hydrocarbons, and halogenated and non-halogenated organophosphorus compounds. Nonlimiting examples of suitable inorganic compounds used as flame retardant additives include salts of zinc, antimony, aluminum, and molybdenum. Another class of suitable flame retardants for the core of the multilayer material of the present invention include organic reactive agents such as brominated aromatics, brominated aliphatic polyols, and phosphorous-containing polyols. The choice of a particular flame retardant for the core depends on several factors, e.g., the level of flame resistance desired for the article, the chemical characeristics of the polymer or copolymers which form the core, and the effect of the flame retardant upon the physical and electrical properites of the multilayer material.

A preferred flame retardant for the present invention when the core is formed from a polycarbonate is a copolycarbonate derived from a halogenated bisphenol-A and a dihydric phenol. Such an additive is described in U.S. Pat. No. 4,188,314, incorporated herein by reference, and typically contains from 2 to about 10 repeating units of the formula

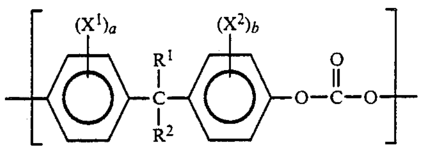

I.

wherein $R^1$ and $R^2$ are hydrogen, (lower) alkyl or phenyl, $X^1$ and $X^2$ are bromine, chlorine, or alkyl or aryl groups having bromine or chlorine attached thereto; and at least one a or b is from 1 to 4. Such additives may be used alone or in combination with synergists such as organic or inorganic antimony-containing compounds.

These copolycarbonate flame retardant additives may be prepared by the polymerization of a mixture of a halogenated dihydric phenol and a chain stopper, as described in U.S. Pat. No. 4,188,314.

An especially preferred flame retardant for the core material of the present invention has the formula:

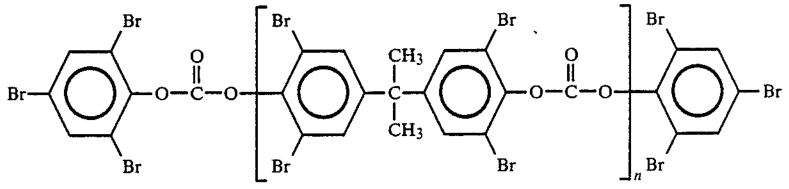

II.

wherein Br represents bromine and n may be from about 3 to about 7.

Yet another preferred flame retardant for the core of the present invention is a polyhalodiphenyl carbonate containing about 6 to about 10 halogen atoms, such as decabromodiphenyl carbonate. It will be apparent to those skilled in the art that mixtures of the above organic and inorganic flame retardants may also be used in the core of the multilayer material of the present invention.

It also within the scope of the present invention to include, in lieu of or in addition to the flame retardants, described above, a flame retardant component comprising an admixture of an aromatic polycarbonate and a polytetrafluoroethylene (PTFE) resin. The aromatic polycarbonate of this component may comprise any of the aromatic polycarbonates or copolycarbonates described above, as well as mixtures thereof. It is preferred that the polycarbonate have a number average molecular weight of about 8,000 to about 200,000, an especially preferred molecular weight being in the range of about 10,000 to about 80,000. Moreover, the polycarbonate may have an intrinsic viscosity of about 0.30 to 1.0 dl/g as mentioned in methylene chloride at 25° C. The PTFE resin for this flame retardant component may be any of those well-known in the art and commercially available, such as Teflon 30, a product of Dupont Company, or ICI Chemical Corporation's AD-1. Furthermore, PTFE resins may be made by processes well-known in the art, e.g., U.S. Pat. No. 2,393,967. It is preferred to use such PTFE resins in the form of particles having average diameters of about 0.05 micron to about 0.5 micron.

In embodiments of the present invention using the above-described PTFE/aromatic polycarbonate component, the weight ratio between PTFE and the aromatic polycarbonate should be between about 10:90 and 0.05:99.95. Furthermore, although the effective amount of this flame retardant additive to be added to the core depends on the polymeric nature of the core and the presence, if any, of other flame retardants, it is preferred that the flame retardant additive comprise about 0.3% by weight, based on the total weight of the core, when the core is formed from a polycarbonate and a copolycarbonate derived from a halogen-substituted dihydric phenol and a dihydric phenol.

The PTFE/aromatic polycarbonate flame retardant component may be prepared by pre-mixing the ingredients, compounding the pre-mix by extrusion at a temperature of from about 480° F. to about 540° F., and subsequently cooling and chopping the extrudate into pellets. Moreover, this flame retardant component may be added in dry form to the composition forming the core of the present invention by various well-known methods. The addition of the PTFE/aromatic polycarbonate flame retardant component to the core is especially useful as a substitute for the inclusion of conventional flame retardant agents (e.g., antimony compound) which might detract from certain physical properties of the multilayer material of the present invention, such as elongation on break, impact resistance, and the like. Moreover, the PTFE/aromatic polycarbonate flame retardant component may also be added to the outer layers of the present invention (at levels up to about 0.5% nonvolatile weight) in order to reduce the amount of flaming resin which might drip if the multilayer material were to be ignited.

The thickness of the core material of the present invention will depend upon many factors, such as the end use of the material and its requirements for fire retardancy, tensile strength, and elasticity. The thickness of the core will also depend upon the thicknesses of the outer layers attached to the core. In general, the thickness of the core may range from about 4 mils to about 240 mils. Greater core thicknesses generally provide a greater degree of fire retardancy for the multilayer material. It is also within the scope of the present invention that the core have a thickness greater than 240 mils if mandated by the end use contemplated for the material, or if very thick outer layers are attached to the core.

The method of preparing various polymeric components to form the core of the multilayer material of the present invention is not critical and may be carried out by conventional techniques well-known in the art. For example, dry blends of the components may simply be compounded prior to further processing (e.g., extrusion). Various stabilizers (e.g., stearates) and foaming agents well-known in the art may be added to preserve or enhance the properties of the dry blend. Furthermore, the core may contain well-known reinforcing agents or fillers, such as those described below.

The amount of flame retardant present in the core of the present invention will of course vary with the nature of the particular polymer or copolymers. In general, the appropriate level of flame retardant for many end uses is defined as a level sufficient to achieve a UL94 flammability rating of V-O for thicknesses above 10 mils, or a UL94 VTM-O rating for films from 5 to 10 mils, while maintaining a dry arc track resistance of greater than 90 seconds for the multilayer material. An additional proviso relative to the flame retardant level is that the level should not decrease the tensile strength of the multilayer material below about 9,000 psi, while maintaining the flexural strength above about 12,000 psi. Typically, the level of flame retardant may range from about 0.5% to about 50% by weight of the total weight of the core, while a more preferred range of flame retardant is from about 3% to about 30% of the core weight.

The multilayer material of the present invention may include the flame resistant core described above and only one electrically insulating thermoplastic outer layer in circumstances wehre the multilayer material is in the shape of a tube. For example, the multilayer material comprising the above-mentioned core and an electrically insulating first thermoplastic outer layer attached to a first surface of the core may be used as a type of insulation strip surrounding the perimeter of any sensitive component within an electronic device. Any suitable adhesive compound well-known in the art, e.g., an epoxy, could be used to attach the multilayer material to the perimeter of the component being protected. Furthermore, the multilayer material in tubular form may be used as wire insulation.

It is also within the scope of the present invention that the multilayer material having the flame resistant core and only one electrically insulating first thermoplastic outer layer attached thereto be in the form of a sheet to surround and shield various sensitive components in those instances in which only one side of the multilayer sheet needs to be electrically insulating.

In preferred embodiments of the present invention, the multilayer material comprises a flame resistant core, an electrically insulating first thermoplastic outer layer attached to a first surface of the core, and an electrically insulating second thermoplastic outer layer attached to a second surface of the core opposite the first surface. An ideal material which is 'electrically insulating' is defined herein as one having an arc track resistance (ATR) greater than about 90 seconds, a surface resistivity of greater than about $10^9$ ohms per square mil, and a comparative track index (CTI) of about 50 drops at a minimum of about 500 volts, when the material has a thickness in the range of about 5 mils to about 250 mils. However, it will be apparent to those skilled in the art that a material might be deemed 'electrically insulating' for certain end uses if its CTI exceeds 500 volts but its ATR is less than 90 seconds, or vice versa. Various polymeric materials may be used to form the first and second outer layers, such as poly(ethylene terephthalate) (PET), polycarbonates, polyphthalate carbonates, other thermoplastic polyesters, copolyester-carbonates, and mixtures thereof. All of these polymers are known in the art and are described in various references. For example, PET is described in U.S. Pat. No. 3,953,394, and is also described in Organic Polymer Chemistry, K. Saunders, Chapman and Hall Ltd., 1973. Polycarbonates are also well-known in the art, as described above. Copolyester-carbonate resins are known in the art and are described in U.S. Pat. No. 4,487,896, issued to the assignee of the present invention. All of the above-described polymers are excellent electrical insulators, e.g., when polymerized and formed into layers, they exhibit a high resistance to the action of a high-voltage, low-current arc close to their surface, while also exhibiting a high resistance to the formation of a conductive path on the surface. Furthermore, these materials resist the tendency to become electrically conductive due to localized thermal and chemical decomposition and erosion.

An especially preferred polymeric material useful in forming the outer layers of the present invention is a blend of a polyester derived from cyclohexanedimethanol and a mixture of iso- and terephthalic acids with an aromatic polycarbonate. The polyester forming a part of this blend is known in the art and is described, for example, in U.S. Pat. Nos. 4,391,954 and 4,188,314, both incorporated herein by reference. Such polyesters may be prepared by condensing either cis- or trans-isomers (or a mixture thereof) of 1,4-cyclohexanedimethanol with a mixture of iso- and terephthalic acids. Such polyesters have recuring units of the formula:

III.

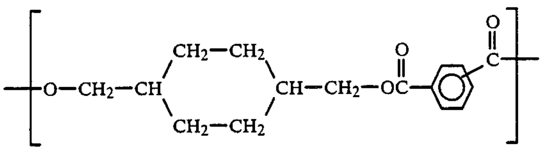

The iso- and terephthalic acids used herein for such polyesters are generally hexacarbocyclic dicarboxylic acids in mixtures ranging from about 5% to about 90% isophthalic acid and from about 95% to about 10% terephthalic acid, preferably from about 10% to about 80% isophthalic acid and from about 90% to about 20% terephthalic acid, and most preferably from about 10% to about 25% isophthalic acid and from about 90% to about 75% terephthalic acid. The cyclohexanedimethanol-based polyesters of the present invention may be prepared by well-known methods in the art, such as those set forth in U.S. Pat. No. 2,901,466, incorporated herein by reference. Furthermore, these polyesters should have an intrinsic viscosity between about 0.40 and 2.0 dl/g when measured in a mixture of 60% phenol/40% tetrachloroethane solution at 25° C.-30° C. It is understood by those skilled in the art that other bifunctional glycols may be condensed with the 1,4-cyclohexane dimethanol for mixture with the iso- and terephthalic acids described above.

It is also within the scope of the present invention to include an effective amount of a reinforcing agent or filler. Such additives are well-known in the art and include materials such as talcs, aluminum silicates (clay), zinc oxide, barium sulfate, precipitated or natural calcium carbonate, zinc sulfide, glass fibers, glass spheres, carbon fibers, other metal fibers, whiskers, or particles, etc., as well as mixtures thereof. The amount of reinforcing agent or filler in the present invention depends upon the end use contemplated for the article, and will also depend upon the effect of the particular filler or reinforcing agent upon the electrical insulating properties of each outer layer. Generally, the total amount of reinforcing agent and filler present in each outer layer should be less than about 1.5% by weight, based on the total weight of each outer layer.

Various well-known colorants may be present in the outer layers of the present invention in amounts which do not affect the electrical insulating properties of the multilayer material. Such colorants include dyes such as anthraquinone, azo, acid, basic, chrome, direct dyes, and the like. Such colorants further include various organic and inorganic pigments such as titanium dioxide, metallic oxides, earth colors, metal powder suspensions, carbon black, phthalocyanine, para red, lithols, toluidine, toners, lakes, etc. The selection of a particular colorant will depend upon choice of color, compatibility with polymers used in the multilayer material, and the effect of the particular colorant upon the dielectric properties of the multilayer material. The level of colorant should not decrease the surface resistivity of the multilayer material below $10^9$ ohms while also not decreasing the volume resistivity below about $10^{10}$ ohm-cm. Furthermore, the level of colorant should not decrease the arc track resistance below about 90 seconds. Typically, the total nonvolatile weight of the colorant is less than about 1% by weight of the weight of an outer layer of the present invention.

The first and second outer layers of the present invention may also include effective amounts of ultraviolet light (UV) stabilizers. Such stabilizers are well-known in the art and are described, for example, in the *Modern Plastics Encyclopedia*, Volume 56, No. 10A, McGraw-Hill Inc., Oct., 1979. The selection of a particular ultraviolet light stabilizer depends upon the particular composition of the outer layer, and upon the end use contemplated for the article. Typically, such UV absorbers are present in amounts ranging from about 0.01% to about 0.3% of their nonvolatile weight, based on the total weight of each outer layer.

Another preferred polymeric material which may be used to form the outer layers is a copolyester-carbonate composition which is generally formed by the reaction of a dihydric phenol, a carbonate precursor, and a difunctional carboxylic acid. Such compositions are well-known in the art and are described, for example, in U.S. Pat. Nos. 3,169,121 and 4,487,896, both incorporated herein by reference. Preferred copolyester-carbonate resins are formed by reacting (a) a carbonate precursor; (b) at least one difunctional carboxylic acid or a reactive derivative thereof; and (c) at least one dihydric phenol represented by the general formula:

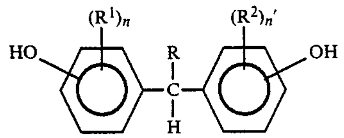

IV.

wherein:

R is selected from straight chain alkyl radicals containing from about one to about 5 carbon atoms, $R^1$ is independently selected from the group consisting of aryl radicals, alkaryl radicals, halogen radicals, and monovalent hydrocarbonoxy radicals, $R^2$ is independently selected from the group consisting of aryl radicals, alkaryl radicals, halogen radicals, and monovalent hydrocarbonoxy radicals, and n and n' may independently have a value of from 0 to 4.

In preferred embodiments of the present invention, the copolyester-carbonate resin composition may further contain another copolyester-carbonate formed by reacting (d) a carbonate precursor; (e) at least one difunctional carboxylic acid or a reactive derivative thereof, and (f) at least one dihydric phenol represented by the general formula:

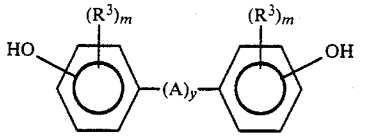

V.

wherein $R^3$ is independently selected from the group consisting of monovalent hydrocarbon radicals, halogen radicals, and monovalent hydrocarbonoxy radicals;

y is either 0 or 1;

m may independently have a value of from 0 to 4; and

A is a divalent radical selected from the group consisting of the following divalent hydrocarbon radicals:

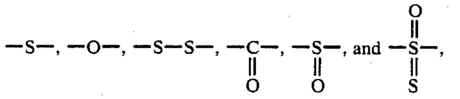

VI.

The copolyester-carbonates used in the present invention are prepared by methods well-known in the art and described, for example, in U.S. Pat. No. 4,487,896. Such methods include interfacial polymerization, transesterification, melt polymerization, solution polymerization, etc.

It will be apparent to those skilled in the art that the first and second outer layers of the multilayer material of the present invention may be comprised of different polymeric materials. For example, the first outer layer may be formed from a blend of a polycarbonate with polyesters derived from cyclohexanedimethanol and a mixture of tere- and isophthalic acids, as described above, while the second thermoplastic outer layer is formed from poly(ethylene terephthalate).

The thickness of each outer layer will depend upon several factors, including the degree of electrical insulation required for the multilayer material, as well as the degree of tensile strength and elasticity required. It will be apparent to those skilled in the art that greater thicknesses afford more electrical insulation, and that if one of the outer layers of the present invention is to be directly exposed to a very high voltage, that outer layer might be provided with a greater thickness than the other outer layer. Typically, each outer layer of the present invention will range in thickness from about 1 mil up to about 10 mils, with a preferred thickness in the range of about 5 mils to about 10 mils. It is also possible for the outer layers to have thickness greater than 10 mils if the thickness of the core is also increased so that the amount of flame retarding material(s) in the core. remains proportional to the total weight of the multilayer material.

In certain embodiments of the present invention in which a higher degree of impact strength and tear resistance is desired for the multilayer material, a layer of a material which enhances such properties may be applied on top of one or both of the outer layers of the present invention. For example, polymeric materials such as copolyesters and copolyetheresters have excellent tear strength, flex-life, toughness, and impact strength. These polymeric materials are well-known in the art and are described, for examples, in U.S. Pat. Nos. 4,355,155; 4,264,761; 4,156,774; 3,801,547; 3,784,520; 3,766,146; 3,763,109; 3,651,014; 3,023,192. Such materials may be modified with PBT and a monoalkenyl arene-conjugated diene copolymer, if desired. The thickness of layers of these materials will depend upon the amount of reinforcing and impact-related characteristics desired for the article of the present invention. Typically, such layers will have thicknesses of from about 1 mil to about 10 mils when the thickness of each first and second outer layer is about 8 mils and the thickness of the core layer is about 14 mils. Moreover, these copolyesters and copolyesteresters may by themselves form one or both of the outer layers of the multilayer material of the present invention.

It is within the scope of the present invention to apply a coating material on the first and second outer layers in those instances in which additional physical characteristics, such as abrasion resistance, are desired. The coating material may generally be any of the conventional coatings which are air-dried, heat-cured, or radiation-cured. Examples of conventional thermoplastic coating materials are acrylic-based lacquers, while examples of conventional heat-curable thermosetting coating materials include phenolics, unsaturated polyesters, alkyds, epoxies, silicones, and the like. Examples of typical radiation-curable coatings include these described in the Kirk-Othmer Encyclopedia of Chemical Technology, 3rd Edition, Volume 19, 1982, pages 607-622. The coating material must be electrically insulating while also being physically and chemically compatible with the first and second outer layers. The coating materials may be applied to the outer layers of the present invention by methods well-known in the art, e.g., spraying, brushing, dipping, roll coating, and the like. Moreover, the coating material may be applied to the multilayer material of the present invention after coextrusion or after thermoforming.

The multilayer material of the present invention may be structurally formed by methods well-known in the art. For example, after full polymerization of each polymeric material forming the core and each outer layer, the layers may be laminated under varying conditions of heat and pressure. In order to form such laminates, an adhesive material may be applied to the first and second surfaces of the core or to each outer layer surface which faces the core. Those skilled in the art will recognize that various adhesive materials may be used to accomplish such an objective. Generally, any suitable adhesive interlayer material which is chemically and physically compatible with the materials which form the core and outer layers is suitable for the present invention. An example of a suitable adhesive is a polycarbonate-polysiloxane block copolymer such as those described in U.S. Pat. No. 3,189,662. Examples of such block copolymers are LR-3320 and LR-5530, manufactured by General Electric Company.

In preferred embodiments of the present invention, the multilayer is formed by coextrusion. Coextrusion apparatuses are well-known in the art and are described, for example, on page 284 of the Modern Plastics Encyclopedia, McGraw-Hill Inc., Oct., 1979, Volume 56, No. 10A.

When the shape of the multilayer material must coincide with the shape of a particular component being shielded, i.e., a sensitive component being protected, the multilayer may be shaped by processes well-known in the art, such as thermoforming. Such a process is described on pages 390–400 of the Modern Plastics Encyclopedia reference referred to above. Typically, the multilayer material may be thermoformed after coextrusion at temperatures ranging from about 225° F. to about 325° F. The sheet is forced against the contours of a mold by mechanical or pneumatic means, followed by cooling of the shaped multilayer material. An unexpected advantage of the present invention is that the outer layers may be formed from either amorphous or crystalline materials when the core is formed from an amorphous material, as described above, even when the multilayer material is to be subjected to thermoforming. Furthermore, the multilayer material of the present invention may be thermoformed if the core is formed from a crystalline material and the outer layers are formed from amorphous materials.

Another unexpected advantage related to the multilayer material of the present invention is that the flame resistant core material also provides flame resistance to the outer layers. While the mechanism for this characteristic of the present invention is not completely understood, the examples described below demonstrate that the multilayer material is generally self-extinguishing while also displaying good electrical insulation characteristics. Furthermore, the absence of flame retardant additives in the outer layers results in the maintenance of excellent physical properties for the multilayer material, such as tensile strength, flexural strength, and dimensional stability.

A method of shielding sensitive components from electrical discharges with a flame resistant material is also within the scope of the present invention. The method comprises forming a shield by coextruding a flame resistant core with an electrically insulating first thermoplastic outer layer attached to a first surface of the core and an electrically insulating second thermoplastic outer layer attached to a second surface of the core opposite the first surface; shaping the shield by thermoforming into a shape which coincides with the shape of the component being protected; and then attaching the shield to the component. The core of the multilayer material used in this method may be any of the polymeric materials described above for the core, e.g., a blend of a polycarbonate with a halogenated polycarbonate. The first and second outer layers may also be formed from polymers or copolymers described above, e.g., polyesters and polycarbonates. In practicing such a method, the multilayer material may be attached to the entire surface of the device being shielded, e.g., by the use of well-known adhesives, or by vibration-welding. In preferred embodiments of the present invention, an air gap for additional insulation is provided between the multilayer material and the component. The shaped multilayer material may be fastened by screws or bolts on a frame which surrounds the device, and the frame itself may be fastened to the walls of an enclosing cabinet, for example.

The following specific examples describe the novel multilayer material of the present invention. They are intended for illustrative purposes of specific embodiments only and should not be construed as a limitation upon the broadest aspects of the invention. All percentages are expressed in nonvolative weight units, unless otherwise noted.

All physical teste described herein were carried out according to procedures established by the American Society for Testing and Materials (ASTM), unless otherwise indicated.

The electrical insulation tests were performed according to ASTM D-495, unless otherwise indicated. Arc track resistance (ATR) was measured using a Beckman Model ART-1. The electrode gap was 0.250 inch, unless otherwise indicated.

Flammability tests were performed according to the Underwriters' Laboratories Bulletin No. 94 test, in which a sample having approximate dimensions of 2.5" by 0.5"×0.125" is contacted with a Bunsen burner flame for 30 seconds. The details of the test are disclosed in the UL94 bulletin and in U.S. Pat. No. 3,809,729. The test also characterizes the material as "dripping" or "nondripping", since flaming drops of resin which could cause adjacent structures to burn are of concern. Multiple values in the following tables indicate multiple trials on the same sample (or a substantially identical sample).

EXAMPLE 1

Samples 1–3 were outside the scope of the present invention, while samples 4–8 were within the broad scope of the present invention. Samples 1–4 contained as a core material a 50%/50% by weight blend of an aromatic polycarbonate (Lexan® resin) and a flame retardant copolycarbonate derived from a halogenated bisphenol-A and a dihydric phenol. Each outer layer was formed from a polyester derived from cyclohexanedimethanol and a mixture of iso- and terephthalic acids (Kodar A150, a product of Eastman Kodak Company). A phosphite/epoxy heat stabilizer was added to both the core and outer layers at a level of less than 0.06%, based on the total weight of the multilayer material. No pigments were present in Samples 1–4.

Samples 5–8 contained the same core material as in samples 1–4. Each outer layer was formed from a blend of Kodar A150 with an aromatic polycarbonate (Lexan® resin). A pigment mixture of 1.4% titanium dioxide and 0.4% phthalocyanine was also incorporated into each outer layer.

Samples 1–8 were all conventionally coextruded and were then subjected to the below-described tests. The test results are displayed in Tables 1 and 2.

TABLE 1

| Layer Thickness (mils) | Sample 1 1/18/1 | Sample 2 2/16/2 | Sample 3 3/14/3 | Sample 4 4/12/4 | Sample 5 1/18/1 | Sample 6 2/16/2 | Sample 7 3/14/3 | Sample 8 4/12/4 |
|---|---|---|---|---|---|---|---|---|
| Tensile Strength at Yield (psi)[a] | 11,340 | 11,480 | 10,980 | 11,780 | 9,241 | 11,480 | 11,100 | 10,520 |
| Tensile Strength at Break (psi)[a] | 10,360 | 10,290 | 10,180 | 11,130 | 8,819 | 10,100 | 10,090 | 9,914 |
| Elongation at Break (%)[a] | 14 | 17 | 21 | 16 | 9 | 17 | 54 | 40 |
| Yellowness Index[e] | 1.2 | 1.1 | 1.3 | 1.2 | — | — | | |
| Light Transmission (%)[f] | 89.8 | 89.9 | 89.6 | 89.6 | — | — | | |

TABLE 1-continued

| Layer Thickness (mils) | Sample 1 1/18/1 | Sample 2 2/16/2 | Sample 3 3/14/3 | Sample 4 4/12/4 | Sample 5 1/18/1 | Sample 6 2/16/2 | Sample 7 3/14/3 | Sample 8 4/12/4 |
|---|---|---|---|---|---|---|---|---|
| Haze (%)[f] | 2.1 | 1.4 | 2.4 | 1.8 | — | — | | |

[a]D638 (ASTM)
[b]D790 (ASTM)
[c]D648 (ASTM)
[d]D696 (ASTM)
[e]D1925 (ASTM)
[f]D1003 (ASTM)

It is clear from Table 1 that the physical properties of both embodiments of the material of the present invention are excellent. Table 2 depicts various flammability and electrical values for samples 1-8:

TABLE 2

| Layer Thickness (mils) | Sample 1 1/18/1 | Sample 2 2/16/2 | Sample 3 3/14/3 | Sample 4 4/12/4 | Sample 5 1/18/1 | Sample 6 2/16/2 | Sample 7 3/14/3 | Sample 8 4/12/4 |
|---|---|---|---|---|---|---|---|---|
| Burning Time (seconds) | 0,0,0 | — | — | 1.5;0;0 | 0;0;0 | — | — | 0,0,0 |
| Number of Burning Particles | 0,0,0 | — | — | 0;0;0 | 0;0;0 | — | — | 0,0,0 |
| Longest Burning Particle (seconds) | None | — | — | None | None | — | — | None |
| Arc Track Resistance (seconds)[g] | 5.1; 4.3 | 13.5; 12.4 | 63.5; 9.8 | 1.9; 3.4 | 43.1; 29.2; 69.9 | 72.2; 77.0; 69.7 | 69.1; 79.3; 75.9 | 37.2; 49.1; 71.0; 75.8; 81.4 |
| Surface Resistivity (× $10^{16}$ ohms)[h] | 0.6 | — | 1.11; 2.05; 7.63 | 2.14; 12.1 | — | 2.96; 8.9 | 0.5; 17.8 | 26.7; 59.0 |
| Volume Resistivity (× $10^{16}$ ohm-cm)[h] | — | — | 1.88; 2.5 | 5.0; 17.3 | | 3.0; 5.0 | 3.21; 7.50 | 2.81; 5.63 |
| Comparative Track Index (50 drops) (volts)[i] | 180 | 180 | 180 | | | | | |
| Comparative Track Index (volts) | | | | 550 | 550 | 550 | 550 | 550 |
| Flammability[j] | V-0 | V-0 | V-0 | V-0 | V-0 | V-0 | V-0 | V-0 |

[g]D495 (ASTM)
[h]D257 (ASTM)
[i]UL 746-A
[j]UL 94

Table 2 demonstrates that the multilayer materials of the present invention display a high level of flame resistance. The absence of burning particles is an additional advantage of the present invention, especially in view of the fact that the outer layers were not provided with a flame retardant agent. The arc track resistance data depicts values which vary somewhat due to surging in the extruder. The variances were substantially eliminated upon adjustment of the extrusion temperature and feed rate.

Furthermore, samples 4-8 exhibit excellent CTI characteristics. In certain instances, it may be desirable to provide higher ATR values, and this might be accomplished by increasing the thickness of the outer layers, as described above.

EXAMPLES 2

Samples 9-24 were each within the broad scope of the present invention and contained the same core material as samples 1-8. Each outer layer of samples 9-24 was formed from the same polyester/polycarbonate blend which formed the outer layers of samples 5-8. The samples were coextruded and tested for arc track resistance. The applied voltage ranged from 114 volts to 119 volts. The following results listed in Table 3 were obtained:

TABLE 3

| Sample No. | Layer Ratio (Outer/Core/Outer)(mils) | CTI (volts) | ATR (Sec) | Flammability (UL94) |
|---|---|---|---|---|
| 9 | 4/22/4 | >500 | 81.2 | V-0 |
| 10 | 4/22/4 | >500 | 74.0 | V-0 |
| 11 | 4/22/4 | >500 | 93.7 | V-0 |
| 12 | 4/22/4 | >500 | 75.7 | V-0 |
| 13 | 4/22/4 | >500 | 73.1 | V-0 |
| 14 | 4/22/4 | >500 | 123.4 | V-2 |
| 15 | 4/22/4 | >500 | 117.8 | V-0 |
| 16 | 4/22/4 | >500 | 78.5 | V-0 |
| 17 | 4/22/4 | >500 | 76.9 | V-0 |
| 18 | 4/22/4 | >500 | 126.8 | V-0 |
| 19 | 4/22/4 | >500 | 80.0 | V-0 |
| 20 | 4/22/4 | >500 | 83.7 | V-0 |
| 21 | 6/18/6 | >500 | 132.2 | V-2 |
| 22 | 6/18/6 | >500 | 123.4 | V-2 |
| 23 | 6/18/6 | >500 | 123.1 | V-0 |
| 24 | 6/18/6 | >500 | 165.1 | V-2 |

Variations according in ATR values for the materials are attributed in part to surging in the extruder, which altered layer thicknesses and thereby also altered electrical circuit characteristics. Generally, increasing the thickness of the outer layers increased the ATR values. Samples 21-24 surpassed industry requirements for arc track resistance, comparative track index, and flame resistance.

EXAMPLE 3

Samples 25 and 26 were outside the scope of the present invention. Sample 25 was a monolayer material (i.e., without outer layers attached thereto) formed from a flame resistant polycarbonate material, and had a thickness of about 2 mils. Sample 26 contained the same material as sample 25, but had a thickness of about 5 mils. Each sample was transparent and contained less than 0.06% by weight of a phosphate/epoxy heat stabilizer. The samples were extruded and subjected to the tests listed in Table 4.

TABLE 4

| | Sample 25 | Sample 26 |
|---|---|---|
| Thickness | 2 mils | 5 mils |
| Tensile Strength @ Yield[a] | 10,950 psi | 10,950 psi |
| Tensile Strength @ Break[a] | 10,500 psi | 10,500 psi |
| Elongation @ Break[a] | 25% | 25% |
| HDT | | |
| @ 264 psi(1.82 MPa)[b] | 285° F. | 285° F. |
| @ 66 psi(0.46 MPa)[b] | 295° F. | 295° F. |
| Coeff. of Thermal Expansion[c] (in/in/°F.) | $3.8 \times 10^{-5}$ | $3.8 \times 10^{-5}$ |
| Haze (%)[d] | 0.2 | 0.2 |
| Transmittance (%)[d] | 91.0 | 91.0 |
| Dielectric Strength (kV/mil)[e] | 4.4 | 4.4 |
| Volume Resistivity(ohm-cm)[f] | $5.0 \times 10^{17}$ | $3.6 \times 10^{16}$ |
| Arc Track Resistance[g] | 22 sec. | 10 sec. |
| CTI (50 drops)[h] | 194 V | 182 V |
| Specific Gravity[i] | 1.41-1.46 | 1.41-1.46 |
| Flammability[j] | V-0 | V-0 |

[a]D638 (ASTM)
[b]D648 (ASTM)
[c]D696 (ASTM)
[d]D1003 (ASTM)
[e]D149 (ASTM)
[f]D257 (ASTM)
[g]D495 (ASTM)
[h]UL 746-A
[i]D792 (ASTM)
[j]UL 94

The above results indicate that a monolayer material containing a flame retardant possesses excellent flame resistance but poor electrical insulation properties, and therefore does not meet industry standards for the end uses described above.

EXAMPLE 4

Samples 27 and 28 were also outside the scope of the present invention. Sample 27 was a monolayer material, i.e., without outer layers attached thereto, having a thickness in the range of about 10-30 mils. The core contained only a blend of Kodar A150 with an aromatic polycarbonate, and was not pigmented. Sample 28 was also an unpigmented monolayer material, with a thickness of about 4 mils, and contained only PET. Both samples also contained less than 0.06% by weight of a phosphite/epoxy heat stabilizer. After extrusion, the tests listed in Table 5 (same test methods as used above) were performed on each sample.

TABLE 5

| | Sample 27 | Sample 28 |
|---|---|---|
| Thickness | | |
| Tensile Strength @ Yield (psi) | 8,300 | 40,000 |
| Tensile Strength @ Break (psi) | 8,000 | — |
| Elongation @ Break (%) | 125 | 50 |
| Flexural Strength (psi) | 12,000 | — |
| Flexural Modulus (psi) | 280,000 | — |
| Heat Distortion Temperature (°C.) | | |
| @ 264 psi (1.82 MPa) | 99 | 38-41 |
| @ 66 psi (0.46 MPa) | 107 | — |
| Coeff. of Thermal Expansion (in/in/°F.) | $3.9 \times 10^{-5}$ | — |
| Haze (%) | 0.1 | — |
| Transmittance (%) | 92.0 | — |
| Dielectric Strength | 440 V/Mil | — |
| Dielectric Constant @ 100 Hz | 3.02 | — |

TABLE 5-continued

| | Sample 27 | Sample 28 |
|---|---|---|
| Volume Resistivity (ohm/sq) | $4.2 \times 10^{16}$ | $10^{18}$ |
| Surface Resistivity | — | $10^{16}$ |
| Arc Track Resistance (Seconds) | >100 | >90 |
| Comparative Track Index (50 drops) (Volts) | >500 | >500 |
| Specific Gravity | 1.20 | 1.38-1.41 |
| Flammability | HB | HB |

The results in Table 5 indicate that monolayer materials formed from thermoplastics which merely provide electrical insulating properties are not flame resistant, and therefore do not meet industry standards for the end uses described above.

EXAMPLE 5

Samples 29-31 were within the broad scope of the present invention and contained the same core and outer layer materials as samples 9-24. However, each layer of samples 29 and 30 further included 0.2% by weight AD-1 Polytetrafluoroethylene, a product of ICI Corporation. Sample 31 included 0.2% by weight AD-1 in the outer layers and further included 0.2% by weight AD-1 in the core. Each sample was coextruded and subjected to the flammability and arc track resistance tests described above. The following results were obtained:

TABLE 6

| | Sample 29 | Sample 30 | Sample 31 |
|---|---|---|---|
| Layer Thickness (Outer/Core/outer) (mils) | 7/19/4 | 6/19/5 | 7/19/4 |
| Arc Track Resistance (seconds) | 73.0 (7 mil side) 68.1 (4 mil side) | 72.8 (6 mil side) 68.4 (5 mil side) | 81.0; 114.0; 93.7 (7 mil side) 58.0; 72.1 (4 mil side) |
| CTI (50 drops) | >500 V (4 mil side) | >500 V (5 mil side) | >500 V (4 mil side) |
| Flammability Rating (UL 94) | V-0 | V-0 | V-0 |

Samples 29 and 30 were ignited five times. The flame in each instance self-extinguished within 7 seconds. Two very small non-flaming drips were present, but there were no flaming drips.

Sample 31 was ignited six times. The flame in each instance self-extinguished in less than 7 seconds. One very small non-flaming drip was present, but there were no flaming drips.

The results in Table 6 indicate that the multilayer material of the present invention exhibits excellent comparative track index values while also exhibiting excellent flame resistance. The addition of the teflon material appears to further inhibit the occurrence of flaming drips.

EXAMPLE 6

Samples 32-37 were within the scope of the present invention and contained the same core material as samples 9-24. Each outer layer was formed from a 50%/50% blend of poly(ethylene terephthalate) and a branched polycarbonate. The multilayer material was coextruded and subjected to the ATR and flammability tests listed in Table 7. The samples were identical in composition, but were taken from different portions of the coextruded web of multilayer material. Multiple ATR values indicate that several samples corresponding to the same sample number were taken from the same portion of the web.

TABLE 7

| Sample Number | ATR (seconds) | CTI (50 drops) (volts) | Flammability Rating (UL 94) |
|---|---|---|---|
| 32 | 105.2 | >500 V | V-0 |
| | 119.9 | | V-0 |
| | 121.0 | | V-0 |
| 33 | 124.3 | >500 V | V-0 |
| | 108.7 | | V-0 |
| | 123.1 | | V-0 |
| 34 | 105.6 | >500 V | V-0 |
| | 103.4 | | V-0 |
| 35 | 123.5 | >500 V | V-0 |
| | 103.7 | | V-0 |
| 36 | 95.8 | >500 V | V-0 |
| | 94.6 | | V-0 |
| 37 | 123.6 | >500 V | V-0 |
| | 123.8 | | V-0 |
| | 123.7 | | V-0 |

The results listed above demonstrate that the use of a PET/polycarbonate outer layer also results in a multilayer material having excellent flame resistance and excellent electrical insulation characteristics.

While the invention has been described with respect to preferred embodiments, it will be apparent that many modifications, variations, and substitutions are possible in light of the above teachings. It is therefore to be understood that changes may be made in the particular embodiments described above which are well within the intended scope of the invention as defined by the appended claims.

What is claimed is:

1. A coextruded flame resistant electrically insulating multilayer material comprising a flame resistant core, said core comprised of a thermoplastic polymer selected from the group comprising polyolefins, poly(aryl ethers), polyetherimides, polyamides, poly(aryl sulfones), thermoplastic polyurethanes, alkenyl aromatic polymers, acrylic-based polymers, polycarbonates, nitrile barrier resins, thermoplastic polyester, and blends of said polymers blended with a flame retardant and an electrically insulating first thermoplastic outer layer wherein said thermoplastic core is the only flame resistant polymer in said multilayer material and wherein said flame retardant is the only flame retardant in said multilayer material.

2. The material of claim 1 further comprising an electrically insulating second thermoplastic outer layer attached to a second surface of the core opposite the first surface.

3. The material of claim 2 wherein the first and second outer layers are formed from polymers or copolymers selected from the group consisting of polyesters and polycarbonates.

4. The material of claim 2 wherein the core and first and second outer layers are extruded simultaneously.

5. The material of claim 2 wherein the core is formed from at least one thermoformable material.

6. The material of claim 2 wherein the thermoplastic polymer core is a polycarbonate.

7. The material of claim 6 wherein the halogen-containing organic compound is a copolycarbonate derived from a halogenated bisphenol-A and a dihydric phenol.

8. A coextruded flame resistant electrically insulating multilayer material comprising a flame resistant core, said core comprised of a thermoplastic polycarbonate polymer blended with a flame retardant comprised of a copolycarbonate derived from a halogenated bisphenol -A and a dihydric phenol, and electrically insulating first and second thermoplastic outer layers attached to a first and second surface of the core, respectively, said second surface of the core opposite to said first surface and wherein the first and second thermoplastic outer layers are polyesters and wherein said thermoplastic core is the only flame resistant polymer in said multilayer material and wherein said flame retardant is the only flame retardant in said multilayer material.

9. The material of claim 8 wherein the polyester forming the first and second outer layers is poly(ethylene terephthalate).

10. The material of claim 8 wherein the polyester forming the first and second outer layers is a blend of a polymer derived from cyclohexanedimethanol and a mixture of iso- and terephthalic acids with an aromatic polycarbonate.

11. A coextrudable and thermoformable multilayer material exhibiting flame resistance and electrical insulative capability, comprising a flame resistant core formed from an aromatic polycarbonate blended with a copolycarbonate derived from a halogenated bisphenol-A and a dihydric phenol, and first and second outer layers attached to first and second surfaces of the core, respectively, said outer layers formed from polymers or copolymers selected from the group consisting of polyesters and polycarbonates.

12. The multilayer material of claim 11 wherein the polymer forming the first and second outer layers is poly(ethylene terephthalate).

13. The multilayer material of claim 11 wherein the polymer forming the first and second outer layers comprises:

(a) a polyester derived from cyclohexanedimethanol and a mixture of iso- and terephthalic acids; and (b) an aromatic carbonate polymer.

14. A coextruded flame retardant electrically insulating multilayer material comprising a flame retardant core, said core comprised of a polycarbonate blended with a halogenated copolycarbonate, and an electrically insulating first thermoplastic outer layer comprised of polymers or copolymers selected from the group consisting of polyesters and polycarbonates, wherein said core is the only flame resistant polymer in said multilayer material and wherein said halogenated copolycarbonate is the only flame retardant in said multilayer material.

15. A multilayer material according to claim 14 wherein said outer layer has a thickness of greater than about 1 mil.

16. A multilayer material according to claim 14 wherein said outer layer has a thickness of from about 1 to about 10 mils.

17. A multilayer material according to claim 14 wherein said outer layer has a thickness of from about 1 to about 7 mils.

18. A multilayer material according to claim 14 wherein said core has a thickness of greater than about 4 mils.

19. A multilayer material according to claim 14 wherein said core has a thickness of from about 4 to about 240 mils.

20. A multilayer material according to claim 14 wherein said core has a thickness of from about 12 to about 22 mils.

21. A multilayer material according to claim 11 wherein each of said outer layers has a thickness of greater than about 1 mil.

22. A multilayer material according to claim 11 wherein each of said outer layers has a thickness of from about 1 to about 10 mils.

23. A multilayer material according to claim 11 wherein each of said outer layers has a thickness of from about 1 to about 7 mils.

24. A multilayer material according to claim 11 wherein said core has a thickness of greater than about 4 mils.

25. A multilayer material according to claim 11 wherein said core has a thickness of from about 4 to about 240 mils.

26. A multilayer material according to claim 11 wherein said core has a thickness of from about 12 to about 22 mils.

27. A multilayer material according to claim 11 wherein each of said outer layers are substantially equal in thickness.

28. A multilayer material according to claim 11 wherein the total thickness of the core and said outer layers is from about 20 to about 30 mils.

29. A coextruded flame resistant electrically insulating multilayer material comprising a flame resistant core, said core comprised of a thermoplastic polymer selected from the group consisting of polyolefins, poly(aryl ethers), polyether imides, polyamides, poly(aryl sulfones), polyurethanes, alkenyl aromatic polymers, acrylic-based polymers, polycarbonates, nitrile barrier resins, and copolymers, mixtures and blends of the foregoing, blended with a flame retardant, and an electrically insulating first thermoplastic outer layer selected from the group consisting of polyesters, polycarbonates, polyphthalate carbonates, copolyestercarbonates and copolymers, mixtures and blends of the foregoing, wherein said thermoplastic core is the only flame resistant polymer in said multilayer material and wherein said flame retardant is the only flame retardant in said multilayer material.

30. A multilayer material according to claim 29 wherein said flame retardant is selected from the group consisting of chlorinated hydrocarbons, brominated hydrocarbons, halogenated organo phosphorous compounds, non-halogenated organo phosphorous compounds, zinc salts, antimony salts, aluminum salts, molybdenum salts, brominated aromatics, brominated aliphatic polyols, phosphorous-containing polyols, an admixture of an aromatic polycarbonate and a polytetrafluoro ethylene (PTFE), and mixtures of any of the foregoing.

* * * * *